United States Patent Office 3,355,510
Patented Nov. 28, 1967

3,355,510
OLEFIN DIMERIZATION PROCESS
Lawrence G. Cannell, Albany, and Eugene F. Magoon, Berkeley, Calif., assignors to Shell Oil Company, New York, N.Y., a corporation of Delaware
No Drawing. Filed Dec. 14, 1965, Ser. No. 513,837
6 Claims. (Cl. 260—683.15)

ABSTRACT OF THE DISCLOSURE

Increased selectivity to straight-chain olefin dimer is obtained by dimerizing lower α-olefins in the presence of a catalyst derived from a hydrocarbon-soluble nickel compound and a dialkylaluminum fluoride.

---

This invention relates to an improved method for the dimerization of olefinic hydrocarbons.

Methods are known in the art for the dimerization and/or polymerization of olefinic hydrocarbons in the presence of a catalyst system comprising a nickel-containing catalyst and an alkyl aluminum halide. Nowlin et al., U.S. 2,969,408 issued January 24, 1961, disclose a process for the polymerization of ethylene in the presence of a hydrocarbon-soluble nickel compound, e.g., a triphenylphosphine nickel carbonyl, and an alkyl aluminum chloride. The process therein disclosed effects the conversion of ethylene to a variety of olefinic products including a dimer, i.e., butene, and substantial quantities of higher molecular weight olefinic product. Belgian Patent No. 640,535, issued November 28, 1963, to Shell Internationale Research Maatschappij N. V., describes a similar process for the dimerization of lower α-olefins by contacting the olefin with a hydrocarbon-soluble nickel compound and an alkyl aluminum chloride, which process is characterized by the production of a high proportion of mono-branched olefin dimers. For example, propylene is dimerized by the process therein described to a product mixture containing a major percentage of methylpentenes.

It is an object of the present invention to provide an improved process for the dimerization of lower α-olefins. More particularly, it is an object to provide an olefin dimerization process of increased selectivity to linear, unbranched olefin dimer products.

It has now been found that these objects are accomplished by contacting a lower α-olefin with a catalyst system comprising a hydrocarbon-soluble nickel compound and an alkyl aluminum fluoride. In contrast with related processes employing alkyl aluminum chlorides or bromides, utilization of an alkyl aluminum fluoride as a catalyst system component results in the production of a product mixture of a relatively high percentage of linear, unbranched olefin dimer.

The nickel-containing catalyst component is a nickel compound of a relatively high solubility in hydrocarbon media. The precise nature of the hydrocarbon-soluble nickel compound is not of major importance and hydrocarbon-soluble nickel compounds of varying types are usefully employed, for example, the nickel salts of inorganic or organic acids or the organo-nickel complexes such as are described in U.S. 2,969,408. A preferred class of nickel compounds, however, comprises nickel salts of mono-hydroxy mono-carboxylic acids which are free from aliphatic unsaturation, have only atoms of carbon and hydrogen besides the oxygen of the hydroxy and carboxy groups and have at least 7 carbon atoms, preferably from 10 to 20 carbon atoms. One class of hydroxy carboxylic acids comprises α-hydroxyalkanoic acids and the nickel salts of α-hydroxydecanoic acid, α-hydroxydodecanoic acid and the like are suitably employed as a catalyst component. Best results are obtained, however, when the hydroxy carboxylic acid is an o-hydroxybenzoic acid, i.e., a salicylic acid, wherein the aromatic ring is additionally substituted with one or more alkyl substituents, preferably from 1 to 2 branched-chain alkyl substituents. Illustrative of this latter class of hydroxy carboxylic acids are diisopropylsalicylic acid, ditert-butylsalicylic acid, tert-octyl-salicylic acid and the like and nickel salts of such alkyl-substituted salicylic acids comprise an especially preferred class of nickel-containing catalyst components, particularly nickel diisopropylsalicylate.

The nickel-containing catalyst component is employed in conjunction with an alkyl aluminum fluoride, i.e., an alkylaluminum difluoride, a dialkylaluminum fluoride or an alkylaluminum sesquifluoride, wherein the alkyl(s) is (are) lower alkyl of up to 6 carbon atoms, preferably of up to 4, such as methyl, ethyl, propyl, sec-butyl, amyl and hexyl. A preferred class of alkyl aluminum fluorides are ethyl aluminum fluorides, especially diethylaluminum fluoride.

The ratio of nickel-containing compound and alkyl aluminum fluoride is selected so that there are from about 2 moles to about 60 moles of the alkyl aluminum fluoride present for each mole of nickel compound. Preferably, molar ratios of alkyl aluminum fluoride to nickel compound of from about 5:1 to about 50:1 are employed. The hydrocarbon-soluble nickel compound is present in catalytic amounts relative to the olefin to be dimerized. Amounts of nickel compound from about 0.0001 mole to about 0.05 mole per mole of olefin are satisfactory.

The process of the invention is broadly applicable to the dimerization of hydrocarbon α-monoolefins of 3 or more carbon atoms. Preferred olefinic reactants are straight-chain hydrocarbon α-olefins, i.e., straight-chain 1-alkenes, of from 3 to 8 carbon atoms such as propylene, 1-butene, 1-pentene and 1-octene. Propylene is a particularly preferred olefinic reactant.

The process is conducted in the liquid phase in a hydrocarbon medium. In certain modifications of the process, as when the olefin has 5 or more carbon atoms, the liquid reaction medium comprises the olefin to be dimerized and no additional reaction solvent is required. In other modifications, the dimerization is conducted in the presence of an inert hydrocarbon reaction solvent which is liquid at the reaction temperature and reaction pressure employed. Illustrative of suitable inert hydrocarbon solvents are hydrocarbons free from aliphatic unsaturation such as hexane, heptane, decane, cyclohexane, benzene, toluene and xylene. When solvent is employed, amounts of solvent up to about 4 moles of solvent per mole of olefin are satisfactory.

The process is preferably conducted in an inert reaction environment so that the presence of reactive materials such as water and oxygen is desirably excluded. Suitable reaction conditions are therefore substantially oxygen-free and substantially anhydrous.

The method of conducting the reaction is not critical. In one modification, the olefin reactant, the catalyst components and any solvent employed are charged to an autoclave or similar pressure reactor and maintained at reaction conditions for the desired reaction period. It is also useful to add one reaction mixture component to the others in increments as by adding the alkyl aluminum fluoride to a hydrocarbon solution of the nickel compound. In yet an additional modification the process is conducted in a continuous manner as by contacting the olefin and catalyst during passage through a reactor which is typically tubular in form. By any modification, the dimerization is most efficiently conducted at a somewhat elevated temperature and pressure. The reaction temperature suitably ranges from about 40° C. to about 150° C. depending in part on the particular olefin to be dimerized. The temperature range from about 50° C. to about 100° C. is preferred. Suitable reaction pressures are those that serve to maintain the reaction mixture substantially in the liquid phase. Reaction pressures from about 1.5 atmospheres to about 50 atmospheres are in general satisfactory and good results are frequently obtained by utilizing autogenous pressure, that is, the pressure generated by the reaction mixture when maintained at reaction temperature in a sealed reaction system.

At the conclusion of reaction the product mixture is separated and the olefin dimer product is recovered by conventional means such as fractional distillation, selective extraction, extractive distillation, adsorption and the like. Unreacted olefin, solvent and/or catalyst components are suitably recycled for additional conversion.

The products of the process are dimers of the olefin reactant with lesser and generally quite minor amounts of trimer and heavier products. The process of the invention is characterized by the formation of a dimer mixture having a relatively high proportion of linear, unbranched olefin product although mono-branched and di-branched products are also observed. By way of illustration, dimerization of propylene results in the production of a mixture containing n-hexenes, 2-methylpentenes and 2,3-dimethylbutenes, and dimerization of 1-pentene results in the formation of n-decenes, mono-branched decenes, principally methylnonenes, and di-branched decenes, principally dimethyloctenes.

The products of the invention have established utility, being useful for example in the production of polymeric or copolymeric materials by processes of polymerization or copolymerization. In addition, the olefinic products are hydrated or hydroxylated to useful alcohol or glycol products and are dehydrogenated to alkadienes.

To further illustrate the improved process of the invention, the following examples are provided. It should be understood that the details thereof are not to be regarded as limitations as they may be varied as will be understood by one skilled in this art.

*Example I*

A series of runs was made in which propylene was contacted with 1 millimole (mmole) of the nickel salt of diisopropylsalicylic acid and various amounts of diethylaluminum fluoride, provided as a 50% by weight solution in heptane, in 20 ml. of heptane as a solvent. The solvent and catalyst components were charged to a reactor and the propylene was introduced at approximately −60° C. The reactor was sealed and maintained at 50° C. for 72 minutes whereupon the reactor was cooled and opened and the extent of dimer and trimer formation was determined by gas-liquid chromatography of the product mixture. The composition of the hexene fraction, i.e., unbranched, mono-branched or di-branched, was determined by catalytic hydrogenation of the hexene fraction over a Raney metal and/or a palladium-on-carbon catalyst followed by gas-liquid chromatographic analysis of the hexane mixture thereby produced. The results of this series are shown in Table I.

TABLE I

| Run | 1 | 2 | 3 |
|---|---|---|---|
| $(C_2H_5)_2AlF$, mmoles | 9 | 18 | 36 |
| Propylene, g | 22 | 26 | 22 |
| Conversion, percent | 37 | 12 | 60 |
| Dimer, g | 5.5 | 2.8 | 12.4 |
| Trimer, g | 0.3 | 0.3 | 0.8 |
| Hexene Analysis: | | | |
| Di-branched | 4.0 | 2.4 | 2.0 |
| Mono-branched | 45.0 | 47.9 | 57.2 |
| Unbranched | 51.0 | 49.7 | 40.8 |

*Example II*

A series of runs was made wherein 460 millimoles of 1-pentene was contacted with 2 millimoles of nickel diisopropylsalicylate and various diethylaluminum halides. In this series, the olefin and the catalyst components were charged to an autoclave and maintained at 50° C. for 1 hour. Subsequent to reaction, the composition of the product mixture was determined by the procedure of Example I. The results of this series are shown in Table II wherein the heading "X" identifies the diethylaluminum halide in terms of the halide moiety thereof.

TABLE II

| Run | 1 | 2 | 3 | 4 |
|---|---|---|---|---|
| X, millimoles | I, 15 | Br, 15 | Cl, 15 | F, 18 |
| 1-pentene: | | | | |
| Conversion, Percent | 1.5 | 29.0 | 22.8 | 3.8 |
| Selectivity to— | | | | |
| Dimer, Percent | | 95.5 | 93.4 | 92.0 |
| Trimer, Percent | | 4.5 | 6.6 | 8.0 |
| Decene Analysis, Percent: | | | | |
| Unbranched | | 11.5 | 14.1 | 38.8 |
| Mono-branched | | 63.2 | 66.2 | 59.2 |
| Di-branched | | 20.3 | 19.7 | 2.0 |

*Example III*

A series of runs was conducted by a procedure similar to that of Example II wherein mixtures comprising 460 millimoles of 1-pentene, 2 millimoles of nickel diisopropylsalicylate and various amounts of diethylaluminum fluoride were maintained for 1 hour at various temperatures. The results of this series are shown in Table III.

TABLE III

| Run | 1 | 2 | 3 |
|---|---|---|---|
| Temp., ° C | 75 | 100 | 100 |
| $(C_2H_5)_2AlF$, mmoles | 18 | 18 | 36 |
| 1-pentene: | | | |
| Conversion, Percent | 4.7 | 6.4 | 1.9 |
| Selectivity to— | | | |
| Dimer, Percent | 85.0 | 90.9 | 97 |
| Trimer, Percent | 15.0 | 9.1 | 3 |
| Decene Analysis, Percent: | | | |
| Unbranched | 31.9 | 42.5 | 39 |
| Mono-branched | 64.3 | 55.5 | 59 |
| Di-branched | 3.8 | 2.0 | 2 |

*Example IV*

The procedure of Example II was followed to conduct a series of runs wherein 460 millimoles of 1-pentene was contacted with 2 millimoles of bis(triphenylphosphine) nickel halide and 15 millimoles of diethylaluminum halide (18 mmoles in Run 1). In each case the reaction temperature was 50° C. and the reaction time was 1 hour. The results of this series are shown in Table IV.

TABLE IV

| Run | 1 | 2 | 3 | 4 | 5 |
|---|---|---|---|---|---|
| Catalyst System: | | | | | |
| Nickel compound | [$(C_6H_5)_3P]_2NiCl_2$ | [$(C_6H_5)_3P]_2NiCl_2$ | [$(C_6H_5)_3P]_2NiCl_2$ | [$(C_6H_5)_3P]_2NiCl_2$ | [$(C_6H_5)_3P]_2NiBr_2$ |
| Aluminum compound | $(C_2H_5)_2AlF$ | $(C_2H_5)_2AlCl$ | $(C_2H_5)_2AlBr$ | $(C_2H_5)_2AlI$ | $(C_2H_5)_2AlBr$ |
| 1-pentene: | | | | | |
| Conversion, percent | 6.5 | 24.4 | 41.4 | 10.5 | 32.3 |
| Selectivity to— | | | | | |
| Dimer, percent | 100 | 95.9 | 94.9 | 100 | 97.2 |
| Trimer, percent | 0 | 4.1 | 5.1 | 0 | 2.8 |
| Decene Analysis, percent: | | | | | |
| Unbranched | 40.5 | 19.2 | 23.7 | 26.1 | 22.2 |
| Mono-branched | 56.8 | 73.1 | 72.0 | 71.0 | 73.2 |
| Di-branched | 2.7 | 7.7 | 4.3 | 2.9 | 4.6 |

We claim as our invention:

1. In the process for the dimerization of α-olefins by contacting a hydrocarbon α-monoolefin of from 3 to 8 carbon atoms with a catalytic amount of a hydrocarbon-soluble nickel compound and an alkyl aluminum halide in an inert reaction environment in the liquid phase at a temperature from about 40° C. to about 150° C., the improvement which comprises using as the alkyl aluminum halide a dialkylaluminum fluoride wherein all alkyls are alkyl of up to 6 carbon atoms.

2. The process of claim 1 wherein the dialkylaluminum fluoride is diethylaluminum fluoride.

3. The process of claim 1 wherein the hydrocarbon α-monoolefin is propylene.

4. The process of claim 1 wherein the hydrocarbon α-monoolefin is 1-pentene.

5. The process of claim 1 wherein the hydrocarbon-soluble nickel compound is a nickel salt of a mono-hydroxy mono-carboxylic acid free from aliphatic unsaturation, having only atoms of carbon and hydrogen besides the oxygen of the hydroxy and carboxy groups and having at least 7 carbon atoms.

6. The process of claim 5 wherein the mono-hydroxy mono-carboxylic acid is diisopropylsalicylic acid.

References Cited

UNITED STATES PATENTS 2,969,408  1/1961  Nowlin et al. _____ 260—683.15
3,113,115  12/1963  Ziegler et al. _____ 252—429

FOREIGN PATENTS 896,822  5/1962  Great Britain.
1,385,503  12/1964  France.

PAUL M. COUGHLAN, JR., *Primary Examiner.*